United States Patent Office 3,484,969
Patented Dec. 23, 1969

3,484,969
DISPLAY DEVICE
Henry Alan Newland, 7 Stanley Crescent,
Filed Nov. 27, 1967, Ser. No. 686,393
London W. 11, England
Claims priority, application Great Britain Dec. 2, 1966,
53,973/66
Int. Cl. G09f 11/30, 7/00
U.S. Cl. 40—65                                7 Claims

ABSTRACT OF THE DISCLOSURE

The specification describes a display device which can be used for the controlled display of any one of a number of signs or messages for use for example in advertising. The nature of the plates used to present such messages is described together with means for causing relative movement of the plates so as to display the desired message.

---

This invention relates to display devices and especially to devices which can be used to display one of a number of signs or messages or to show no message at all.

It is known to provide advertising devices with relatively movable screens in which alternative matter on a back screen can be viewed between spaced parallel lines on a front screen as for example in U.S. specification No. 911,561. With such an apparatus only one of two alternate messages can be viewed unless the grid lines are at least twice as wide as the spacings between them in which case the displayed message through the relatively narrow spacings would appear distorted.

It is an object of the present invention to display any one of a number of pre-selected signs or messages with the minimum of distortion.

According to this invention I provide a display device comprising a first plate bearing a first set of parallel, opaque stripes of width substantially equal to the spacings between the stripes, a plurality of second message-bearing plates positioned so as to lie substantially parallel to said first plate, the said second plate having non-striped areas and striped areas bearing a second set of opaque stripes and spacings corresponding to those of said first set of stripes and either the non-striped or striped areas of said second plate being in the shape of a message or sign to be displayed and means for moving at least one of said plates relative to the other in a direction transverse to the direction of the stripes, the spacings on at least one of said plates being capable of allowing light transmission.

The parallel stripes are not necessarily straight. They may alternatively be wavy lines, e.g. each form a sinusoidal curve, the essential characteristic being that, on movement of the plates relative to each other, the stripes can be made to cover the adjacent spacings.

Forms of the invention will now be described with reference to the accompanying drawings wherein:

FIGS. 1A, B and C represent respectively a first or "masking" plate, a message-bearing plate and the appearance to the viewer when one is placed behind the other;

Figure 1:
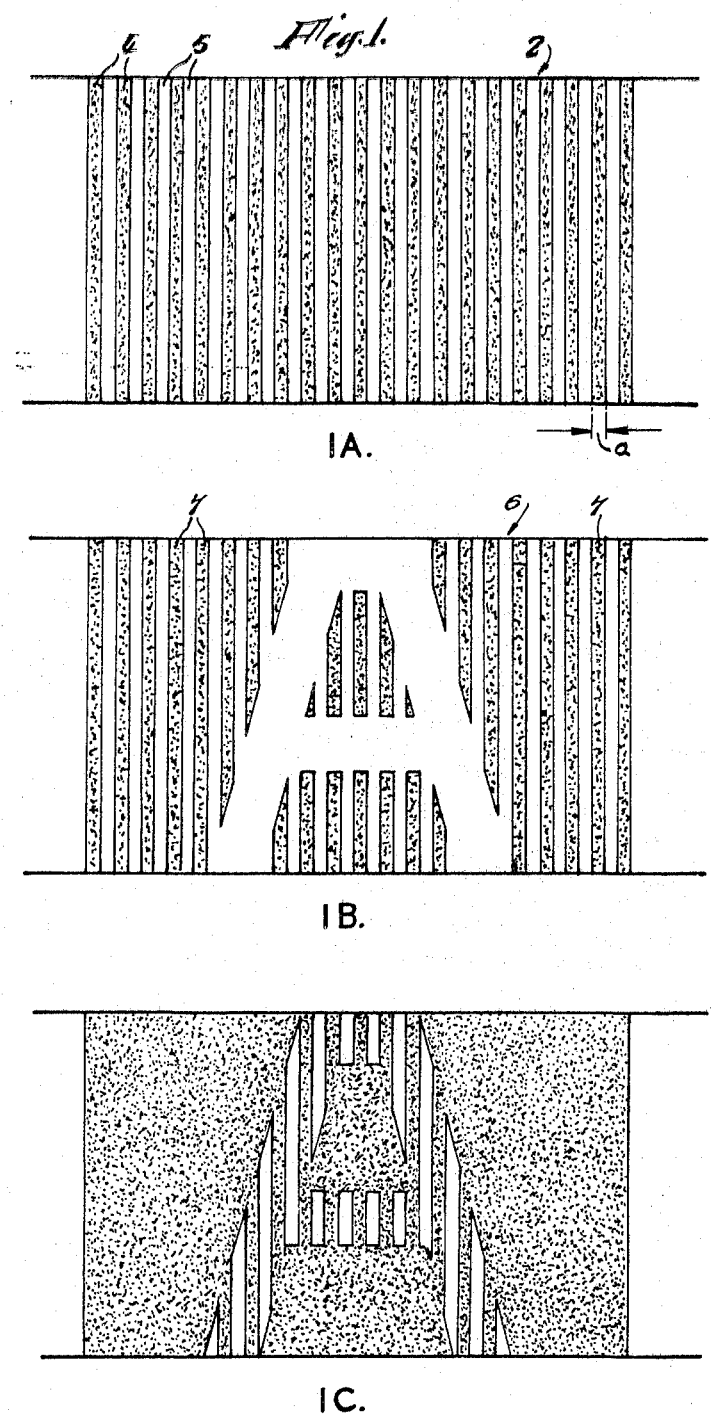

As shown in FIG. 1 of the drawings, the display device comprises a first or masking plate 2 on which are arranged a number of equi-spaced, parallel, opaque stripes 4, the width of the stripes $a$ being equal to or very slightly wider than the spacings 5 between adjacent stripes. The plate 2 may be a sheet of transparent material such as Celluloid or clear P.V.C. with the stripes 4 imprinted or adhered thereto or alternatively the plate may be of opaque material with the spacings 5 cut away to form slots or apertures to allow light to pass through them. Although a pattern of vertical stripes is shown in FIG. 1A, the stripes can be set horizontally or at an angle and need not be straight. The stripes need not be continuous but may give a dot and dashed or other broken effect. The plate 2 is mounted in a suitable apparatus and has lying behind and/or in front of it one or more plates 6 bearing messages or signs such as that shown in FIGURE 1B. The message bearing plate 6 may be of any size such that the message area may all be viewed through the masking plate 2. The message bearing plates 6 are arranged so that they lie parallel to the masking plate 2 and themselves bear striped portions 7, the stripes being of width $a$ equal of those of the masking plate 2 and parallel to them. As shown in FIG. 1B the message, in this case the letter A, may be shown on the plate in the form of an unstriped area. Alternatively, the message itself may be striped and the rest of the plate be transparent.

When the masking plate 2 and message-bearing plate 6 are exactly in register with the stripes of one behind the stripes of the other the message is not visible at all though the masking plate and the viewer will only see an all-over pattern of stripes as in FIGURE 1A. However, when one of the plates is moved out of register by an amount equal to the width of a spacing $a$ the message will be visible through the plate as shown in FIG. 1C with the surround completely opaque. The direction in which the plate is moved will normally be perpendicular to the direction of the stripes but in the case of stripes which are set at an angle the plate may be moved in whichever plane is required to bring the stripes in and out of register. Alternatively, if a message-bearing plate is used in which the message is produced with stripes and the remainder is transparent the message will appear in opaque form with the surround striped.

If a number of message-bearing plates are used behind a single masking plate so that they are initially all in register, movement of any one of the plates through a distance $a$ will display its message. A light can conveniently be positioned behind the set of plates so as to enhance the effect and a sheet of light-diffusing material or light-reflecting material may be positioned behind the plates. Any colors can be used and color changes may be incorporated in either the plates or in the lighting system. If all the plates behind the masking plate have their stripes out of register with the masking plate, i.e. in the "on" position at the same time, no message will be readable through the masking plate but by moving all except one of the plates into the position where the plates are completely in register, i.e. the "off" position, the remaining plates will become readable through the masking plate. Means for relative movement of the plates may take a variety of forms to suit the application for which the device is intended. For instance, the plates may be remotely controlled by means of solenoids or may be hand operated by means of wires or levers or continuously operated by means of an endless belt or a revolving cam shaft.

Figure 2:
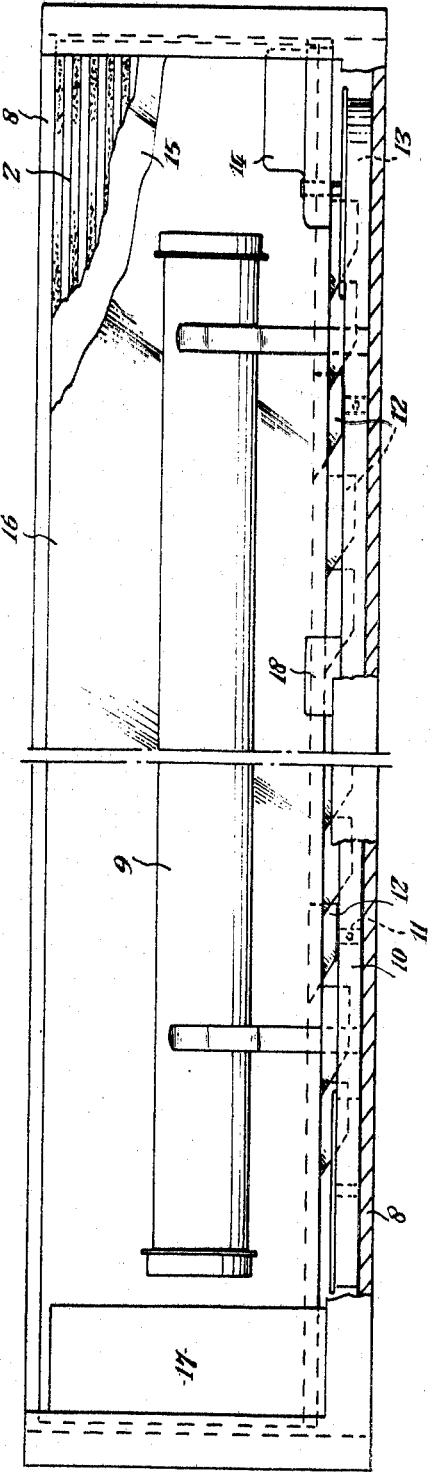
FIG. 2 is a side elevation of one form of display device according to the invention with the front of the device removed and various parts broken away.
Figure 3:
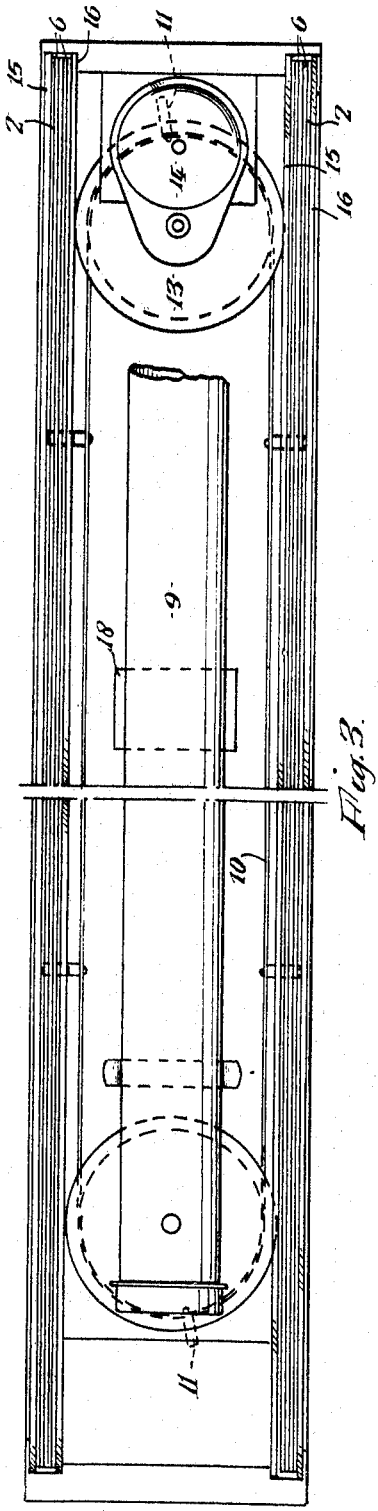
FIG. 3 is a plan view of the device of FIG. 2 with the top cover removed.
Figure 4:
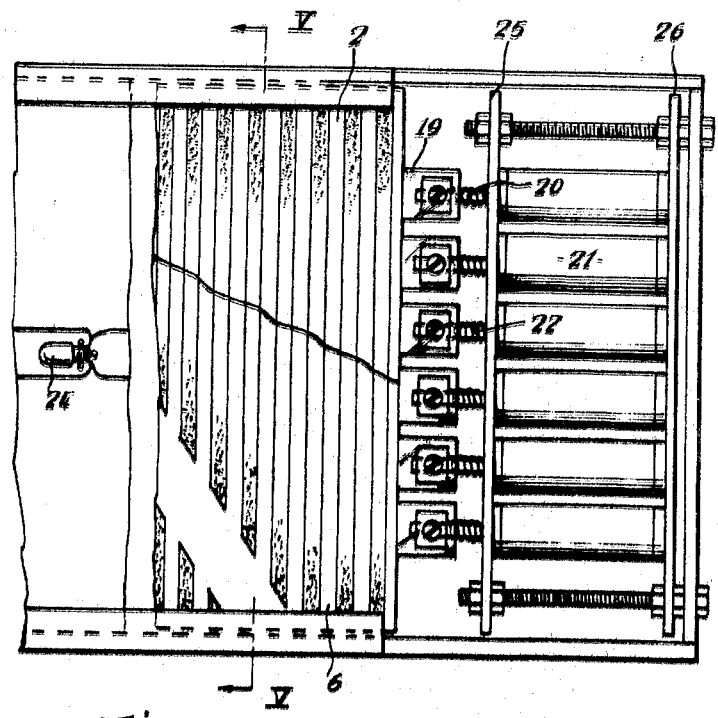
FIG. 4 shows an alternative form of device.
Figure 5:
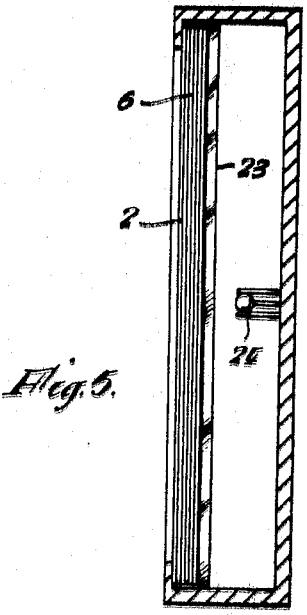
FIG. 5 is a cross section on the line V—V of FIG. 4.

FIGS. 2 to 5 illustrate two alternative forms of means for movement of the plate, FIGS. 2 and 3 illustrating continuous movement and FIG. 4 and FIG. 5 showing a device which can be operated by selective manual control.

In the form of the device illustrated by FIGS. 2 and 3 the device is housed in a casing 8 and comprises two sets of plates each having one masking plate 2 and five message-bearing plates 6 which are banked in parallel formation and move between two sheets of glass 15 and 16 located in slots in the end walls of the device and which form the back and front support for the plates. The sheets 16 are frosted to diffuse the light provided by a fluorescent strip lamp 9. The usual choke 17 and starter 18 are mounted at some convenient position in the casing as shown. In this form of the device the stripes are horizontal as can be seen in FIG. 2 and the stripes of the masking plate 2 are exactly in register with the stripes of the five message-bearing plates when they are in their lowermost position.

Below and slightly inwards from each of the banks of message-bearing plates 6 is located one run of an endless belt 10 on which are positioned at equi-spaced intervals outwardly projecting studs 11. Each of the plates 6 has on its bottom surface adjacent to the belt and studs 11 and positioned toward its ends a pair of tabs 12 which are so located as to be spaced apart by a distance equal to or a multiple of the spacing between the studs 11, for example by a distance of twice the spacing. For each set of plates the pairs of tabs 12 on each of the parallel plates are out of register with those of the other pairs as shown in FIG. 2 of the drawings so as to form two sets of tabs one at the left-hand end of the device and one at the right-hand end. The tabs 12 extend towards the studs 11 so that they will be hit by the studs 11 as the belt is rotated. Thus each pair of tabs and correspondingly each plate 6 will be moved in turn as the belt is rotated and the plate will be thrown upwards a small distance depending upon the overlap between the tabs 12 and the studs 11, this being adjusted so as to be equal to $a$, i.e. the spacing between the stripes. This means that the plates are moved in and out of register with the masking plate in turn. The two sets of plates will be operated simultaneously by the studs on each run of the belt and so the messages can be viewed from either side of the device. The belt 10 may be rotated by means of a motor 14 mounted on one of the wheels 13 of the belt or by any other suitable means. The belt may be made of a material such as nylon or rubber or canvas and the studs 11 may be of a plastics material. The duration for which any one message is shown would be determined by the length of each tab 12 and the speed at which the motor is driven. The fluorescent lamp 9, choke 17 and starter 18 are connected in the usual way to the main supply, as is the motor 14.

If the display device is large and it is desired to show messages which cover a large area and involve large plates, the plates will be too heavy to be lifted by means of studs and tabs as described above. In this case the rotating belt may be mounted at the top of the banks of plates and studs thereon may be adapted to depress the ends of levers, the opposite ends of which are connected to tabs on the top edges of the message-bearing plates so that these plates are levered upward and then allowed to fall under their own weight or by the action of springs on the lower edges of the plates. Alternatively, the belt may be positioned to one side of the outer case to displace the plates sideways (in which case the stripes would be vertical).

In the alternative form of device shown in FIGS. 4 and 5 a single set of six message-bearing plates 6 with a masking plate 2 is employed, this set being stacked between the front of the casing and a frosted glass screen 23. Each plate 6 bears a tab 19 connected to the moving iron core 20 of a solenoid 21. The solenoids are mounted between supporting members 25, 26. When any of the solenoid magnets are magnetised by the passage of current through the solenoid coil the plates 6 move against the action of a return spring 22 and thus pull the attached message plates 6 out of register to display their messages. A suitable source of illumination, for example a set of low-voltage bulbs, of which one bulb 24 is shown in the figures, is located behind the screen 23.

As in the case of FIGURES 2 and 3, two sets of message plates may be mounted, operated by solenoids each of which is common to two plates and connected by a cross-bar, or operated by separate solenoids for each plate and having a common source of illumination between the two sets of plates. The plates on each side of the device may of course bear the same message.

The current to the solenoids can be passed through a control device which enables the operator to select any one of the solenoids for operation and bring the desired message into view.

The display device may be used for many purposes. For example, it may be placed at the rear of a motor vehicle and operated by the driver to display any one of a number of messages. Alternatively, it may be used to show alternative linguistic signs or as a changeable road sign or it may be used purely for advertising purposes.

What I claim and desire to secure by Letters Patent is:

1. In a display device comprising means for supporting a plurality of plates in substantially parallel formation one behind the other, the combination of a first plate bearing a first set of parallel, opaque stripes of width substantially equal to the spacings between the stripes, a plurality of message-bearing plates having non-striped areas and striped areas bearing a second set of opaque stripes and spacings corresponding to those of said first set of stripes and either the non-striped or striped areas being in the shape of a message or sign to be displayed, the message-bearing plates (with the possible exception of the back plate) being capable of allowing light transmission and means for individually sequentially moving the message-bearing plates relative to the first plate in a direction transverse to the direction of the stripes from a non-message position into a message position and back to a non-message position.

2. A display device according to claim 1 wherein the non-striped areas are in the shape of the message to be displayed.

3. A display device according to claim 1 wherein the message-bearing plates are positioned behind and substantially parallel to the said first plate.

4. A display device according to claim 1 wherein all the spacings and non-striped areas on the first plate and message-bearing plates are capable of allowing light transmission and a source of illumination is provided behind the plates.

5. A display device according to claim 1 wherein the means for moving the plates comprises a rotatable belt provided with studs adapted to temporarily engage projections provided on said message-bearing plates.

6. A display device according to claim 1 wherein the means for moving the plates comprises solenoids connected one to each plate.

7. A display device according to claim 1 wherein two sets of message-bearing plates are provided, each set being provided with a first plate and a source of illumination is positioned between these sets so as to provide a device the signs of which can be viewed from both sides.

References Cited

UNITED STATES PATENTS

| Re. 13,109 | 5/1910 | Spiegel | 40—137 |
| 926,393 | 6/1909 | Dirking | 40—52 |
| 3,013,352 | 12/1961 | Delfini et al. | 40—65 X |

FOREIGN PATENTS 919,043    11/1946    France.

EUGENE R. CAPOZIO, Primary Examiner

R. CARTER, Assistant Examiner

U.S. Cl. X.R.

40—137

PO-1050
(5/69)

UNITED STATES PATENT OFFICE
CERTIFICATE OF CORRECTION

Patent No. 3,484,969          Dated December 23, 1969

Inventor(s) Henry Alan Newland

It is certified that error appears in the above-identified patent and that said Letters Patent are hereby corrected as shown below:

Column 4, line 29, after "the" insert--spacings and the non-striped areas on the first plate and--.

line 31, after "individually" insert a comma (,).

SIGNED AND
SEALED
JUN 2 1970

(SEAL)
Attest:

Edward M. Fletcher, Jr.
Attesting Officer

WILLIAM E. SCHUYLER, JR.
Commissioner of Patents